May 2, 1950

W. B. SMITS 2,506,472

ELECTRICAL IGNITION APPARATUS

Filed Dec. 20, 1947

Inventor
Wijtze Beye Smits

By
Attorney

Patented May 2, 1950

2,506,472

UNITED STATES PATENT OFFICE 2,506,472

ELECTRICAL IGNITION APPARATUS

Wijtze Beye Smits, Voorburg, Netherlands

Application December 20, 1947, Serial No. 792,985
In the Netherlands July 3, 1946

7 Claims. (Cl. 315—312)

The invention relates to an electrical ignition apparatus, particularly for internal combustion engines, and it has for its object to avoid the disadvantages of the known ignition devices.

In engines having a great number of cylinders and running with high velocity of rotation the frequency of the ignitions is very high. Thus, the ignition devices must be able to generate and to issue periodically in a very short time the energy for the igniting spark. Especially the inductively operating ignition generators (magnetos) provided with interrupters proved to be insufficient for these purposes by their mechanical and electrical inertia, so that it has already been suggested to provide such generators with a plurality of independent systems.

These difficulties can be substantially overcome by the provision of a condenser for the production of the igniting sparks. However, when such a condenser is charged by induction impulses and/or when the discharge current is led to the sparking plug through a transformer, in engines running with great velocity also the disadvantage exists that the energy of the igniting spark is insufficient for an efficient ignition owing to an insufficient charge of the condenser or due to phenomena of inertia in the transformer.

The invention avoids this disadvantage by this, that the said condenser (the ignition condenser) is charged by an already charged second condenser (the supply condenser) and that at least the discharge of said ignition condenser is controlled by a controllable contact member, for instance a distributor, which periodically and directly connects the sparking plug, or successively each of the sparking plugs, parallel to the ignition condenser, so that the discharge current of said condenser produces the igniting spark directly and the moment of the discharge is exclusively determined by said contact member. The velocity, with which a supply condenser of greater capacity, which already has been charged, can deliver part of its energy to a smaller ignition condenser, is so great that even at the highest speed of the engines the ignition condenser can be entirely charged during the time which lapses between two successive ignitions. The direct connection between the condenser and the sparking plug permits the ignition condenser of being discharged almost entirely during the available very short time, so that the energy of the igniting spark is as great as possible. A further advantage of the apparatus according to the invention is, that the interrupter, which can be a source of defects, can be omitted.

The contact member can be formed as a distributor which connects the ignition condenser to the supply condenser and to the sparking plug alternatively. In order to prevent the ignition apparatus from operation when the engine is stationary and the contact member would be closed, an auxiliary switch can be provided which is controlled by the engine.

Instead of by the discharge current the igniting spark can also be produced by the charge current of the ignition condenser.

These and other features of the invention will be elucidated in the detailed description taken in connection with the accompanying drawings, in which.

Figure 1:
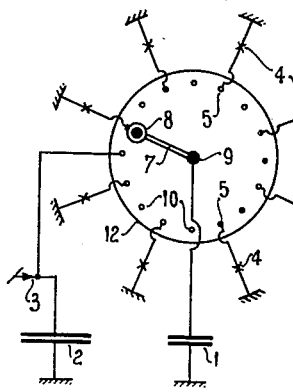
Fig. 1 is a circuit arrangement of a first embodiment of the invention.

In Fig. 1 the ignition condenser is represented by 1, the supply condenser by 2, a conductor for the supply of electrical energy by 3. This conductor is connected to one pole of a direct current source (not shown). Sparking plugs are designated by 4, fixed contacts of a distributor by 5 and a rotatable contact arm of said distributor by 7. This contact arm is provided with a roller 8 at its free end, said roller being passed over the fixed contacts 5 during operation. The contact arm 7 can be rotated about a shaft 9, which is electrically connected to one plate of the igniting condenser. Mounted intermediate the fixed contacts 5 are fixed contacts 10 in the distributor. These contacts 10 are interconnected by a conductor 12, which is connected to one plate of the supply condenser 2. This plate is also connected to the supply line 3.

This device operates as follows:

Every time that the roller 8 of the contact arm 7 is in contact with a fixed contact 10 the ignition condenser 1 is connected to the supply condenser 2, which is kept charged through conductor 3.

Thereby the ignition condenser 1 is charged. When contact arm 7 passes on it contacts a fixed contact 5 so that the ignition condenser 1 is connected directly to a sparking plug. Thereby the ignition condenser 1 is discharged through said sparking plug and a powerful igniting spark of great intensity but low tension is developed.

Figure 2:
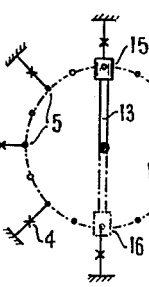
Figs. 2 and 3 show a circuit arrangement and a sectional view of a distributor used in the circuit according to Fig. 1, respectively.
Figure 3:
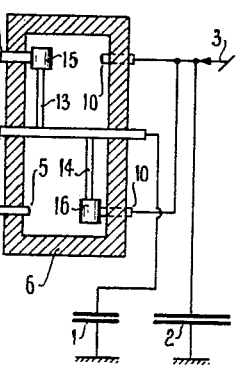

Figs. 2 and 3 show a distributor for the ignition device according to Fig. 1. This distributor has a cylindrical housing 6, of which one side wall supports the fixed contact 5 and the other side wall the fixed contact 10. The contacts 5 and 10 are mounted angularly equidistantly and in an offset relation to one another. Attached to the shaft are two arms 13 and 14, which are 180° spaced apart. The arm 13 is provided with a roller 15 and the arm 14 with a roller 16. These rollers cooperate with the fixed contacts 5 and 10 respectively. The operation of this distributor will be apparent. During rotation of shaft 9 the ignition condenser 1 is connected to the supply condenser 2 and a sparking plug alternately.

Figure 4:
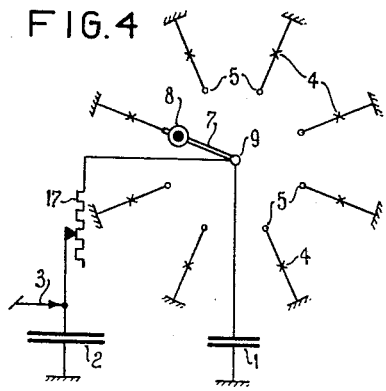
Fig. 4 is a circuit arrangement of another embodiment of the invention.

In the embodiment according to Fig. 4 the supply condenser 2 is continuously connected to the ignition condenser 1 through an adjustable resistance 17. The distributor has only the fixed contacts 5 connected to the sparking plugs. This resistance must be adjusted in such a manner that in the time that the roller 8 passes two successive contacts 5 the ignition condenser 1 is sufficiently charged when the shaft 9 rotates at the highest possible velocity.

It may be noted that several other circuits are possible within the scope of the invention. The distributor can be constructed otherwise. Instead of in the side wall the stationary contacts 5 and 10 of the distributor can be mounted in the cylindrical wall of the housing 6 thereof (Fig. 3). Also the contacts 5 and 10 could be alternately placed in one single circular series and other contacts which are all connected to the ignition condenser 1 could be placed in another circular series parallel to the one comprising the contacts 5 and 10. In that case the contact member 8 could be formed by one single roller connecting alternately the contacts 5 and 10 to the contacts of the second series.

What I claim is:

1. An electrical ignition apparatus comprising, in combination, a distributor having a rotating arm and a plurality of angularly spaced contacts engageable by said arm, a plurality of spark plugs each galvanically connected to a respective one of said contacts, a condenser galvanically connected to said arm, said arm during its rotation successively closing different discharge circuits for said condenser each including said arm and a respective one of said contacts and spark plugs, and a charging circuit for said condenser closed at least in intermediate positions of said arm prior to engagement of each contact by said arm.

2. An apparatus according to claim 1 wherein said arm is provided with a roller rotatably mounted thereon for rolling engagement with each of said contacts.

3. An electrical ignition apparatus comprising, in combination, a source of direct current, an ignition condenser, a distributor having rotating contact arm means and a first and a second set of angularly spaced contacts engageable by said contact arm means, said contact arm means being galvanically connected to said ignition condenser and alternately engaging contacts of said first and second sets during rotation thereof, the contacts of said first set being all connected in parallel to said source, said contact arm means closing a charging circuit for said ignition condenser on engaging any contact of said first set, and a plurality of spark plugs each galvanically connected to a respective contact of said second set, said contact arm means on engaging any contact of said second set closing a discharge circuit for said ignition condenser including said contact arm means, a respective one of said spark plugs and a respective contact of said second set.

4. An apparatus according to claim 3 wherein said source of direct current includes a storage condenser of larger capacity than said ignition condenser.

5. In an ignition system having a plurality of spark plugs, a source of direct current and a condenser for firing said spark plugs, the improvement which comprises a distributor for connecting said condenser alternately to said source and to a respective one of said spark plugs, said distributor comprising a housing, a shaft rotatably mounted in said housing, contact arm means on said shaft, and a first and a second set of contacts fixedly mounted in said housing, the contacts of said first and second sets being positioned for alternate engagement by said contact arm means, the contacts of said first set being all connected in parallel to said source, the contacts of said second set being connected to respective ones of said spark plugs.

6. A distributor according to claim 5 wherein said contact arm means comprises a pair of contact arms axially spaced on said shaft, said first and second sets of contacts being axially spaced from each other for cooperation with a respective one of said contact arms.

7. A distributor according to claim 6 wherein said first and second sets of contacts project from opposite walls of said distributor housing, each of said arms being provided with a roller rotatably mounted thereon for rolling engagement with the contacts of a respective set.

WIJTZE BEYE SMITS.

REFERENCES CITED

The following references are of record in the file of this patent:

UNITED STATES PATENTS

| Number | Name | Date |
|---|---|---|
| 2,125,035 | Smits | July 26, 1938 |
| 2,180,358 | Hooven | Nov. 21, 1939 |
| 2,184,315 | Peters | Dec. 26, 1939 |
| 2,212,404 | Robinson | Aug. 20, 1940 |